(12) United States Patent
Kristoffersen

(10) Patent No.: US 9,739,387 B2
(45) Date of Patent: Aug. 22, 2017

(54) FLUID REGULATOR

(71) Applicant: Isomatic A/S, Randers (DK)

(72) Inventor: Soeren Kristoffersen, Hadsund (DK)

(73) Assignee: Isomatic A/S, Randers (DK)

( * ) Notice: Subject to any disclaimer, the term of this patent is extended or adjusted under 35 U.S.C. 154(b) by 0 days.

(21) Appl. No.: 14/466,045

(22) Filed: Aug. 22, 2014

(65) Prior Publication Data

US 2014/0360599 A1 Dec. 11, 2014

Related U.S. Application Data

(62) Division of application No. 13/119,593, filed as application No. PCT/DK2009/000208 on Sep. 17, 2009, now abandoned.

(30) Foreign Application Priority Data

Sep. 19, 2008 (EP) .................... 08016555

(51) Int. Cl.
*G05D 16/10* (2006.01)
*F16K 17/04* (2006.01)
(Continued)

(52) U.S. Cl.
CPC ............ *F16K 17/044* (2013.01); *F16K 1/307* (2013.01); *F16K 15/063* (2013.01); *F16K 17/06* (2013.01);
(Continued)

(58) Field of Classification Search
CPC ..... F16K 1/307; F16K 31/1221; G05D 16/10; G05D 16/103; G05D 16/106;
(Continued)

(56) References Cited

U.S. PATENT DOCUMENTS 1,923,595 A * 8/1933 Temple ............... G05D 7/0193
137/501
2,731,034 A * 1/1956 Dinkelkamp ............ F16N 5/00
137/495

(Continued)

FOREIGN PATENT DOCUMENTS

CN 1074520 A 7/1993
CN 2146619 Y 11/1993
(Continued)

OTHER PUBLICATIONS

Communication Pursuant to Article 94(3) EPC for Application No. 08016556.6-1801 dated Mar. 14, 2014.
(Continued)

*Primary Examiner* — William McCalister
(74) *Attorney, Agent, or Firm* — McCormick, Paulding & Huber LLP

(57) ABSTRACT

A fluid pressure regulating unit, comprises a fluid inlet port, a fluid outlet port, a valve comprising a movable valve part, wherein the movable part comprises at least one fluid pressure balancing means and wherein the at least one pressure balancing means comprises a tapered surface, and a main valve biasing means. The main valve biasing means biases said valve in the direction of an open position. An auxiliary valve biasing means is provided, biasing the valve in the direction of a closed position. Wherein essentially every surface part, being in fluid connection to the fluid inlet port and having a surface normal at least partially in parallel to the moving direction of the moving part of the valve, is balance by a balancing surface part.

12 Claims, 5 Drawing Sheets

(51) Int. Cl.
*F16K 1/30* (2006.01)
*F16K 15/06* (2006.01)
*F16K 17/06* (2006.01)
*F16K 31/122* (2006.01)

(52) U.S. Cl.
CPC ...... *F16K 31/1221* (2013.01); *F16K 31/1223* (2013.01); *F16K 31/1226* (2013.01); *G05D 16/103* (2013.01); *Y10T 137/7762* (2015.04); *Y10T 137/7835* (2015.04); *Y10T 137/7836* (2015.04); *Y10T 137/7905* (2015.04)

(58) Field of Classification Search
CPC ......... Y10T 137/7796; Y10T 137/7797; Y10T 137/7798; Y10T 137/7808; Y10T 137/7801
USPC ............ 137/505.13, 505.14, 505.15, 505.18, 137/505.25
See application file for complete search history.

(56) References Cited

U.S. PATENT DOCUMENTS

| | | | |
|---|---|---|---|
| 3,437,109 A | | 4/1969 | Carlson et al. |
| 3,576,193 A | * | 4/1971 | Rothfuss ............ G05D 16/0663 137/116.5 |
| 3,890,999 A | * | 6/1975 | Moskow .............. G05D 16/103 137/484.4 |
| 6,079,434 A | * | 6/2000 | Reid ................. G05D 16/0655 137/14 |
| 7,048,001 B2 | * | 5/2006 | Youngberg ........ G05D 16/0608 137/505.25 |
| 2004/0261859 A1 | | 12/2004 | Callies |
| 2007/0209703 A1 | * | 9/2007 | Neumann ............ G05D 16/106 137/102 |

FOREIGN PATENT DOCUMENTS

| | | |
|---|---|---|
| EP | 0081229 A2 | 6/1983 |
| FR | 1324371 A | 4/1963 |
| FR | 2879721 A1 | 6/2006 |
| GB | 07271 | 0/1910 |
| GB | 732693 | 6/1955 |
| GB | 895517 | 5/1962 |

OTHER PUBLICATIONS

Communication Pursuant to Article 94(3) EPC for Application No. 08016555.8-1801 dated Mar. 14, 2014.
International Search Report for Application No. PCT/DK2009/000205 dated May 11, 2009.
International Search Report for Application No. PCT/DK2009/000208 dated May 11, 2009.
Australian Patent Examination Report No. 1 for Australian Patent Application No. 2009295048 dated Jan. 17, 2013.
Australian Patent Examination Report No. 2 for Australian Patent Application No. 2009295048 dated Jun. 25, 2013.
Australian Patent Examination Report No. 3 for Australian Patent Application No. 2009295048 dated Nov. 25, 2013.
Australian Patent Examination Report No. 4 for Australian Patent Application No. 2009295048 dated Mar. 11, 2014.
Australian Patent Examination Report No. 1 for Australian Patent Application No. 2009295049 dated Dec. 13, 2012.

* cited by examiner

FLUID REGULATOR

CROSS REFERENCE TO RELATED APPLICATIONS

This application is a divisional of the U.S. patent application Ser. No. 13/119,593 filed Mar. 28, 2011, which is the National Stage of International Patent Application No. PCT/DK2009/000208 filed on Sep. 17, 2009, which claims priority to European Patent Application No. 08016555.8 filed on Sep. 19, 2008, the contents of which are incorporated by reference.

FIELD OF THE INVENTION

The invention relates to a fluid pressure regulating unit, comprising a fluid inlet port, a fluid outlet port, a valve means and a main valve biasing means, wherein said main valve biasing means biases said valve means in the direction of a first position.

BACKGROUND OF THE INVENTION

Fluid regulators as such are well known in the state of the art. They are used to reduce the pressure of a fluid, entering the fluid regulator on a high pressure side, to a lower pressure level on the fluid outlet side. Preferably, the pressure on the fluid outlet side will be essentially constant. Such pressure regulating units are used, for example, for pressurized gas bottles (pressure cylinders), where the pressure of the gas inside the bottle of up to 300 bars (or even higher) has to be reduced to a lower pressure level of usually 3-10 bars, which can be handled better. In some applications, however, a reduced pressure on a level around 40-50 bars is desired. However, other lower pressures are also possible, like pressures in the area of 20 bars, 30 bars, 60 bars, 70 bars, 80 bars, 90 bars, 100 bars, 110 bars, 120 bars, 130 bars, 140 bars, 150 bars, 160 bars, 170 bars, 180 bars, 190 bars or 200 bars, to give some examples. Another example for the use of fluid regulators are fire extinguishers and/or fire extinguishing systems (fire fighting systems), which can be portable, mobile (built into a vehicle, for example) or stationary (built into a building, for example). Here, the supply of a fire extinguishing agent with a usually changing pressure level during use has to be reduced to a lower pressure level with a preferably constant pressure. The fire extinguishing agent with the reduced pressure level can hence be expelled by an appropriate nozzle, for example.

For the fluid, not only gases are possible. Also, liquids (like liquid $CO_2$, for example), supercritical fluids (where no distinction between the liquid and the gaseous phase is possible any more), and mixtures of liquids, supercritical fluids and/or gases are possible. Also, the fluid can even contain a certain percentage of solids (smoke and/or suspensions, for example).

The problem with the majority of presently existing pressure regulators is the usually high number of movable parts, necessary for the construction of the pressure regulator. Apart from the costs involved with manufacturing and arranging a large number of movable parts, this also gives rise to vibration problems. Such vibrations can lead to the generation of noise and a bad output pressure characteristics (i.e. randomly varying output pressure). Another problem is that in the majority of presently available pressure reducers, the fluid, which pressure has to be reduced, has to change its moving direction several times, when flowing through the pressure regulator. This can give rise to a slow pressure regulation response and therefore to a bad pressure output characteristics. The output characteristics of such a pressure regulator is usually particularly bad, if the fluid input reservoir becomes exhausted and the fluid inlet pressure is getting close to the fluid outlet pressure of the pressure regulator.

For improving the pressure output characteristics and reducing the vibration problems, so called "in-line" constructions have been proposed. In these "in-line" constructions, the number of directional changes of the fluid flowing through the pressure regulator is reduced. Furthermore, the number of moving parts can usually be reduced with in-line constructions. Therefore, in-line pressure regulators usually show less vibrations and a more constant, less fluctuating fluid output pressure.

Examples of pressure regulators, using the "in-line" design can be found in U.S. Pat. No. 2,777,458 and U.S. Pat. No. 3,890,999, for example. However, presently existing designs of in-line pressure regulators still suffer from a number of drawbacks. A major drawback, for example, lies in mounting the pressure regulator for the first time after delivery and in the delivery state of the pressure regulator itself. The problem lies in particular in that the pressure regulator usually is in an open state, when delivered from the manufacturer. This, however, can lead to the release of a too high pressure after mounting the pressure regulator. Furthermore, the pressure regulator can suffer damages during shipment, particularly if the valve of the fluid pressure regulator is shipped in an open position. Also, there are situations, in which it is desired that the pressure regulator can be cut off. With presently available fluid pressure regulators, usually a separate cut-off valve is needed for this.

SUMMARY OF THE INVENTION

The object of the present invention lies therefore in providing an improved fluid pressure regulating unit, as compared to fluid pressure regulating units according to the state of the art.

It is suggested to provide a fluid pressure regulating unit, comprising a fluid inlet port, a fluid outlet port, a valve means and a main valve biasing means, wherein said main valve biasing means biases said valve means in the direction of a first position, with an auxiliary valve biasing means, wherein said auxiliary valve biasing means biases said valve means in the direction of a second position, being different from said first position. Using such an auxiliary valve biasing means, it is possible to reliably close the fluid pressure regulating unit, without the need for a separate fluid cut-off valve. This is of particular advantage, because it is quite often required to reliably cut off the fluid connection. This not only occurs during an initial setup of an arrangement, using a fluid pressure regulating unit, but also during the operation of such an arrangement. Usually, the auxiliary valve biasing means is designed to be relatively weak and/or small as compared to the main valve biasing means. Therefore, the main valve biasing means can usually easily counteract the forces, imposed by the auxiliary valve biasing means, if properly set. It has to be noted that according to usual designs of pressure regulators, a main valve biasing means is already present. Additionally, in usual setups, the main valve biasing means is already designed to have a relatively high strength. Hence, when using presently available main valve biasing means, the forces, imposed by said auxiliary valve biasing means can usually be easily compensated for, e.g. by a slightly higher tensioning of the main valve biasing means. Of course, the auxiliary valve biasing means should be able to provide a force, being sufficient to securely close the valve means of the fluid pressure regulating unit. In the context of the present application, by the notion fluid, liquids, gases, mixtures of fluids and gases and supercritical fluids are in encompassed. It is even possible, that a fluid can contain a certain amount of solid particles (e.g. smoke and/or suspensions).

Preferably, the fluid pressure regulating unit is designed in a way that said first position and said second position are opposing each other, in particular in that said first position corresponds to an open position and said second position corresponds to a closed position of said valve means. Using such an arrangement, the main valve biasing means can easily and effectively compensate for the forces, generated by the auxiliary valve biasing means. In particular, frictional losses or the like can be minimized. If said first position corresponds to an open position and said second position corresponds to a closed position of said valve means, the main valve biasing means usually performs an opening of the pressure regulating unit, while the auxiliary valve biasing means performs the closing of the pressure regulating unit. Of course, in usual setups of pressure regulating units the closing movement of the valve means is also performed by the influence of the fluid pressure on the fluid outlet side of the fluid pressure regulating unit. With the proposed arrangement, already existing fluid pressure regulating units can easily be adapted according to the presently suggested design. Therefore, costs can be reduced and it is even possible to provide a drop-in solution.

Another possible embodiment can be achieved, if said main valve biasing means and/or said auxiliary valve biasing means comprises the fluid pressure operated member and/or an elastically deformable member. The elastically deformable member can be in particular a spring, preferably a metal spring and/or helically wound spring. Such devices are readily available, so that the proposed fluid pressure regulating unit can be manufactured easily, cheaply and in high numbers. A fluid pressure operated member can be of an active and/or a passive type. An active fluid pressure operated member can be realized by providing fluid chambers, which can be fluidly connected to external fluid reservoirs (pressurized and/or unpressurized). Using such an active fluid pressure operated member, an actively controllable fluid pressure regulating unit can be provided. A passive fluid pressure operated member can be realized by providing closed chambers, filled with a gas. This way, a gas spring strut like member can be provided. An elastically deformable member can be essentially made of any elastically deformable material, for example out of rubber and the like. Preferably a spring (e.g. made of metal) can be provided. Although every form of spring can be used, normally a helical spring shows the best results.

It is preferred, if at least one of said valve biasing means, in particular said main valve biasing means is adjustable. This way, the fluid pressure regulating unit can be easily adjusted to the intended use. In particular, the fluid pressure regulating unit can be changed from an initial delivery adjustment, as set by the manufacturer, to an adjustment, needed for the setup, the fluid pressure regulating unit is used for. Normally, the fluid regulating unit is designed in a way that the valve biasing means can be readjusted, e.g. during operation of the unit, when the unit is transferred to a different application and/or when the fluid pressure regulating unit is taken out of the unit and put into another unit.

Preferably, said valve member of said fluid pressure regulating unit comprises a variable fluid flow cross section. This way, an adaptable fluid flux through the fluid pressure regulating unit can be provided. Depending on the fluid outlet flux on the fluid outlet side of the fluid pressure regulating unit, a different fluid flux through the valve means is necessary to sustain a certain pressure level on the fluid outlet side of the fluid pressure regulating unit.

A preferred arrangement is achieved, if said valve member comprises an axially movable tubular unit, wherein preferably said tubular unit comprises an inner passage. Using such an arrangement, usually a very simple setup of the fluid pressure regulating unit can be achieved. In particular, the opening of said axially movable tubular unit on one side can be used as a part of the valve seat arrangement, where the variable fluid flow-cross section of the valve member is located. Using a tubular unit, normally relatively huge changes in fluid flow cross section can be achieved with a relatively small axial movement of the tubular unit. The tubular unit can comprise one or several extensions, in particular radial extensions, which can be used as a fluid pressure receiving surface (in particular of the fluid pressure on the fluid outlet side of the fluid pressure regulating unit) and/or as a web for mounting a mechanical spring, for example. These effects can be particularly well achieved, if the axially movable tubular unit comprises an inner passage. This inner passage can be used for the fluid, being regulated by fluid pressure regulating unit.

It is possible to design the pressure regulating unit in a way that said valve member comprises a valve seat with an essentially even surface, in particular a plate like valve seat. Such a valve seat can be easily and cheaply manufactured. Furthermore, leakage due to imperfections of the valve seat and/or the corresponding valve member can be reduced, because the respective surfaces can be easily and precisely manufactured. Also, unwanted pressure drops, being caused by the valve member, can be reduced, since a relatively large fluid flow cross section can be provided (in particular, if the valve member is arranged in a rotationally symmetric manner) and because the necessary redirection of the fluid, flowing through the fluid pressure regulating unit is relatively small. Also, the valve seat can be designed to be changeable. This way, a fluid pressure regulating unit with a very long lifetime can be provided.

Usually, the fluid pressure regulating unit should be designed in a way that at least one valve biasing means is at least partially in mechanical contact with said tubular unit. This can be achieved, for example, by a direct contact between a mechanical spring and a web of the tubular unit. This way, vibrations due to a play between the valve biasing means and the tubular unit can be reduced. If the (one or several) valve biasing means is in a relatively direct contact with said tubular unit, the pressure output characteristics of the fluid pressure regulating unit can be even further improved.

A preferred embodiment of the fluid pressure regulating unit is achieved, if the position of said valve means is essentially independent of the fluid pressure in said fluid inlet port and/or the position of said valve means is at least partially dependent on the fluid pressure in said fluid outlet port. This way, the desired output pressure characteristics of a pressure regulator can be provided. In fact, the usually desired pressure output characteristics of a pressure regulator is that the fluid output pressure is constant, independent of the fluid inlet pressure. However, sometimes a slight dependence on the fluid inlet pressure is also desired, because the operator can be provided with a feedback on the amount of still available fluid on the high pressure side of the apparatus, for example.

Preferably, the fluid pressure regulating unit is provided with at least one fluid inlet side pressure balancing means. By a fluid inlet side pressure balancing means, any device is in encompassed, which at least essentially provides for a fluid output pressure, being essentially independent of the fluid inlet pressure. For achieving this, every balancing means, known in the state of the art, can be used.

Preferably essentially every surface part, being fluidly connected to said fluid inlet port and having a surface normal at least partially in parallel to the moving direction of the moving part of said valve means, is balanced by a balancing surface part. In other words, every surface which yields a (vectorial fractional) force in the direction of the movement of the moving part of the valve means, when being exposed to a pressure, being applied through the fluid inlet port of the fluid pressure regulating unit, has an "opposing" surface part. The "opposing" surface part is arranged in a way that a (vectorial fractional) second force is generated, when pressure is applied to the fluid inlet port of the fluid pressure regulating unit. The two forces are preferably of the same magnitude and of opposite directions. Therefore, the occurring forces can cancel each other and the resulting net force can be zero. In other words, the valve means can be independent of the pressure on the fluid inlet side of the fluid pressure regulating unit.

Additionally and/or alternatively it is also possible that said valve member, in particular said axially movable tubular unit is designed and arranged with a minimum of surface parts, being fluidly connected to said fluid inlet port and having a surface normal at least partially in parallel to the moving direction of the moving part of said valve means. In particular, said axially movable tubular unit can comprise a tapered surface part. Using such a design, the above described balancing of surface parts can be at least in part avoided. It is to be noted that for example radial surface parts of the movable tubular unit do not yield a (net) force, pointing in the direction of movement of the movable tubular unit. In particular, if no balancing is necessary, fluid flow delays resulting in small, time dependent pressure variations on balancing surface parts can be avoided, yielding an improved behaviour of the fluid pressure regulating unit. The tapered surface part of the movable tubular unit can be particularly arranged on the side, being fluidly connected with the fluid outlet port of the fluid pressure regulating unit. Using tapered surface parts, in particular a highly leak-proof valve seat can be provided for.

Preferably, the adjustment of at least one of said valve biasing means is performed using a biasing thread. With a biasing thread, a relatively large movement (e.g. by the operator of the machinery) can be translated into a small movement of the respective biasing means. Thus, the fluid pressure regulating unit can be precisely adjustable. Also, threads are usually self locking.

A preferred embodiment can be achieved, if said valve means is in said second position, in particular in a closed position, if that main valve biasing means is in a weakly biased and/or unbiased state. Thus, by loosening the main valve biasing means, a positive closing of the fluid pressure regulating unit can be easily performed by the auxiliary valve biasing means.

Preferably, the fluid pressure regulating unit is designed and arranged as an in-line regulator unit. Using such a design, the number and amount of redirections of the fluid, flowing through the fluid pressure regulating unit can be minimized, thus yielding an improved pressure output characteristic of the fluid pressure regulating unit. Furthermore, using an in-line design, the resulting vibrations can usually be reduced.

Preferably, said fluid pressure regulating unit comprises at least one actuator means. This way, it is possible to close the fluid pressure regulating unit positively by applying an external signal, for example. This closing of the fluid pressure regulating unit can be performed independent of the fluid pressure at the fluid output port. This way, the functionality of an actuated cut-off valve can be easily incorporated into the fluid pressure regulating unit.

It is possible to design said fluid pressure regulating unit in a way that pilot pressure applying means are provided, which preferably can be selectively connected to said first fluid port and/or said second fluid port. This way, the actuator of the resulting unit can be switched, using fluid pressures. In particular it is even possible to change the state of fluid pressure regulating by the pressures, occurring in the fluid to be influenced by the fluid pressure regulating unit. Of course, it is possible to perform a switching of the pilot pressure actuated fluid pressure regulating, using a different switching means. The switching means can be based on the fluid pressure, mechanical forces, electricity, magnetic forces and the like, for example.

Another embodiment of said fluid pressure regulating unit can be achieved, if said pilot pressure applying means can be connected to a respective fluid pressure reservoir via a fluid throughput reducing means. Such a fluid throughput reducing means can be a throttle or an orifice opening, for example. Using such a device, the "consumption" of the actuating fluid can be advantageously decreased. Furthermore, it possible to provide for a "soft" changeover between different states of the valve unit, which can result in decreased wear of the fluid pressure regulating unit.

BRIEF DESCRIPTION OF THE DRAWINGS

The present invention and its advantages will become more apparent, when looking at the following description of possible embodiments of the invention, which will be described with reference to the accompanying figures, which are showing.

DETAILED DESCRIPTION OF THE PREFERRED EMBODIMENTS

Figure 1:
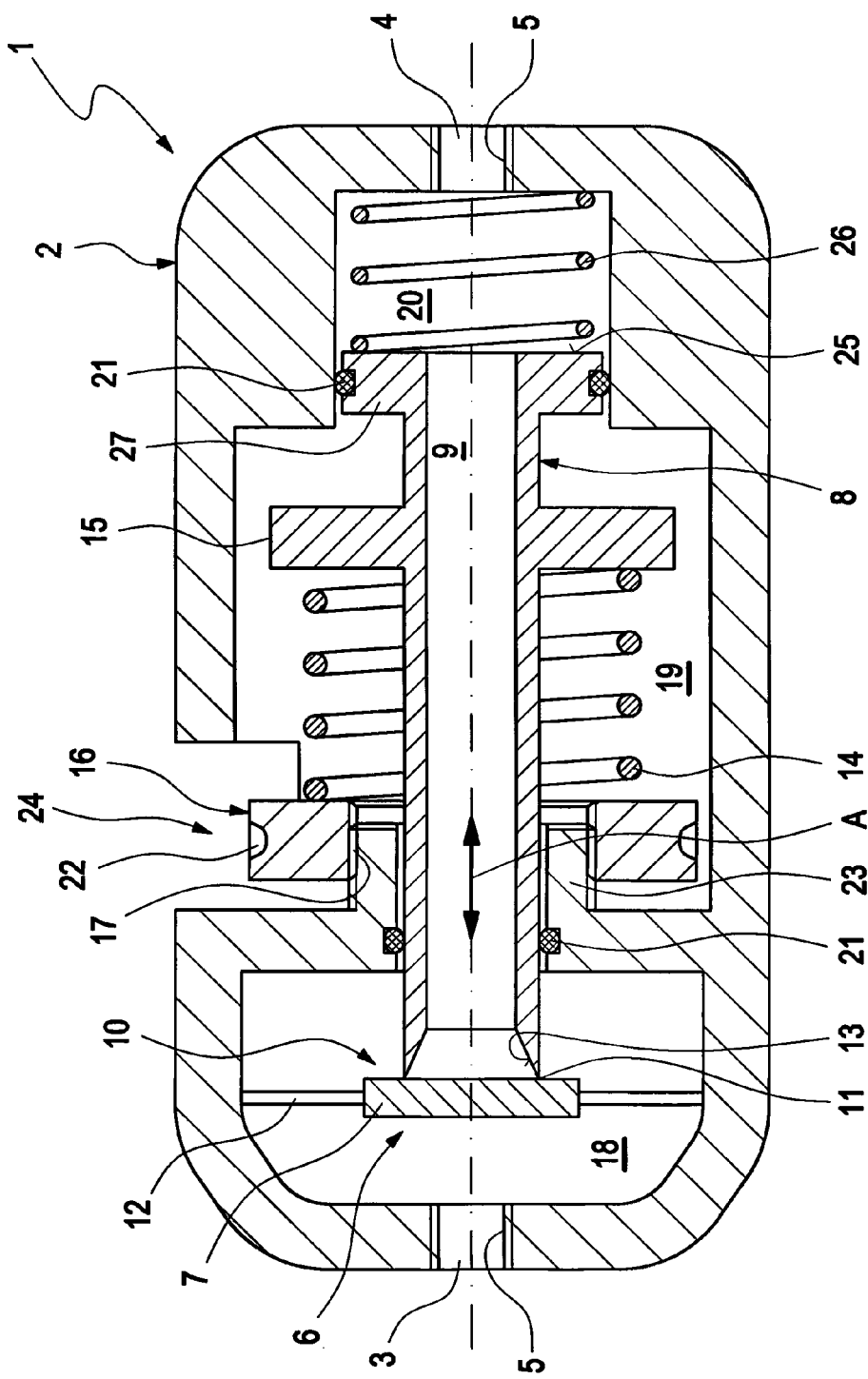
FIG. 1: is a first embodiment of a pressure regulator with an auxiliary spring.

In FIG. 1, a schematical cross section through a first possible embodiment of a pressure regulator 1 is depicted. The pressure regulator 1 comprises a casing 2 with a fluid inlet port 3 and a fluid outlet port 4. Both fluid inlet port 3 and fluid outlet port 4 have an inner thread 5, so that a corresponding fluid pipe or fluid hose can be threadingly engaged in the respective fluid port 3, 4.

Within the casing 2 of the pressure regulator 1, a valve unit 6 is arranged. The valve unit 6 essentially consists of a valve seat 7 and a valve tube 8. The valve tube 8 can be moved in an axial direction (as indicated by double-headed arrow A) within the casing 2 of the pressure regulator 1.

The valve tube 8 is designed to have a hollow interior 9, forming an inner fluid line 9 through the valve tube 8. The contacting area between valve seat 7 and valve tube 8 forms the valve opening 10. If the valve tube 8 is in its leftmost position (as drawn in FIG. 1), the valve seat 7 and the contacting edge 11 of the valve tube 8 contact each other, thus closing the valve opening 10. In this position, no fluid flow is permitted between fluid inlet port 3 and fluid outlet port 4. When the valve tube 8 is moving to the right, however, the contacting edge 11 of the valve tube 8 and the valve seat 7 get out of contact from each other, thus opening the valve opening 10. Hence, fluid can flow from the fluid inlet port 3 to the fluid outlet port 4.

In the embodiment of the pressure regulator 1, shown in FIG. 1, the valve seat 7 is designed as a flat, circular plate. The valve seat 7 is held in place by several holding bars 12. Between the holding bars 12, openings are provided, so that fluid can pass through. Corresponding to the design of the valve seat 7, the valve tube 8 is designed to have a circular cross section. Consequently, the contacting edge 11 shows a circular cross section. In the area close to the valve opening 10, the valve tube 8 comprises tapered edges 13 on the inner side 9 of the valve tube 8, thus forming sharp contacting edges 11. The valve seat 7 is made of a slightly deformable material, so that the contacting edges 11 can slightly indentate the valve seat 7, thus forming a tight fluid seal.

In a normal working adjustment position (main spring 14 biased), the valve tube 8 is pushed out of contact with the valve seat 7 (thus opening the valve opening 10) by means of the main spring 14. The main spring 14 is supported on its right side (see FIG. 1) by a circular web 15 integrally formed with the valve tube 8. On the left side, the main spring 14 is supported by a nut 16. The nut 16 shows an inner thread 17, which is engaged to a corresponding thread, arranged on the outer side of a collar like extension 23 of the casing 2. By a turning action of the nut 16, the nut 16 can be displaced in an axial direction A by means of the thread 17. Therefore, the biasing force of main spring 14 can be adjusted to the appropriate amount. For ease of manipulation, the nut 16 is designed to have a plurality of openings 22 for insertion of a part of an appropriate tool. Also, the casing 2 of the pressure regulator 1 is designed with an access window 24 for easy manipulation of the nut 16. Hence, the second interior space 19 within the casing 2 of pressure regulator 1 shows ambient pressure. Therefore, sealing rings 21 are provided between first internal space 18, second internal space 19 and third internal space 20, respectively.

The working cycle of the pressure regulator 1 is as follows:

Initially, the valve tube 8 is in its open position (right side in FIG. 1; valve opening 10 is open). Fluid at high pressure enters the fluid inlet port 3 of the pressure regulator 1. The fluid flows through the first internal space 18, past the opened valve opening 10, through the inner fluid line 9 of valve tube 8 into the third internal space 20. According to an actual fluid flow demand, part of the fluid entering third internal space 20 leaves the casing 2 of the pressure regulator 1 by fluid outlet port 4. However, in an open position of the valve unit 6, a positive net fluid flow into the third internal space 20 occurs. Therefore, pressure builds up in the third internal space 20. With increasing pressure, an increasing force is exerted on the piston surface 25 of the valve tube 8. At some point, the net force, pushing the valve tube to the left exceeds the net force, pushing the valve tube 8 to the right. Thus, the valve opening 10 closes and the pressure within the third internal space 20 remains at its set level. If the pressure inside the third internal space 20 drops again due to fluid, leaving through fluid outlet port 4, the valve tube 8 will move slightly to the right, thus opening the valve opening 10 slightly. Hence, an equilibrium is achieved, so that the pressure in the third internal space 20 remains constant.

Apart from the pressure, exerted by the fluid within third internal space 20 onto the piston surface 25 of valve tube 8, an additional force is exerted by means of an auxiliary spring 26. The auxiliary spring 26 has a small spring constant, when compared to the spring constant of main spring 14. Thus, in a normal adjustment position of pressure regulator 1, the main spring 14 may easily compensate for the pressure, exerted by auxiliary spring 26. However, if the nut 16 is adjusted in a way that main spring 14 is (essentially) in an unbiased state, the force, exerted by auxiliary spring 26 is sufficient to safely close the valve unit 6 of the pressure regulator 1. Therefore, no additional valve is needed, although the functionality of a cut-off valve is implemented in the pressure regulator 1.

The closed position of the pressure regulator 1 (main spring 14 unbiased), is also advantageous for shipping the pressure regulator 1. In particular, normal vibrations during transportation of the pressure regulator 1 will not be able to open and close the valve unit 6 repetitively. Thus, a wear of the pressure regulator 1 during transportation can be avoided.

Also, the auxiliary spring 26 can provide for an unambiguous position of the tube 8. Therefore, one always know in which position the system will start and/or the system was arranged.

Another feature of the pressure regulator 1, shown in FIG. 1, is that the axially movable valve tube 8 shows no surface parts within the first internal space 18 (high pressure chamber), which have to be balanced. If a fluid pressure is present in first internal space 18, every surface of the valve tube 8, being in contact with the high pressure fluid in first internal space 18 shows a surface normal, being solely perpendicular to the moving direction of the valve tube 8. Therefore, any pressure within first internal space 18 will neither generate force, urging the valve tube 8 in an open position, nor generate a force, urging the valve tube 8 in a closing direction. Therefore, the high pressure part of pressure regulator 1 is perfectly balanced, even without balancing surfaces.

On the inner side of the valve tube 8 in the vicinity of the valve opening 10, the movable valve tube 8 shows a tapered surface 13, creating a sharp edge 11. This way, fluid resistance is reduced, if the valve opening 10 is open. Also, a tight seal can be provided if the valve opening 10 is closed. It has to be noted that the tapered part 13 of the valve tube 8 is additionally working as a balancing surface for the respective surface part of the piston surface 25 of the valve tube 8 (both fluidly connected to the fluid outlet port 4). However, in the presently depicted embodiment of FIG. 1, the pressure regulator 1 is still dependent on the fluid outlet pressure, because a flange part 27 is provided for the valve tube 8, showing a cross section, exceeding the cross section of tapered surface parts 13.

Figure 3:
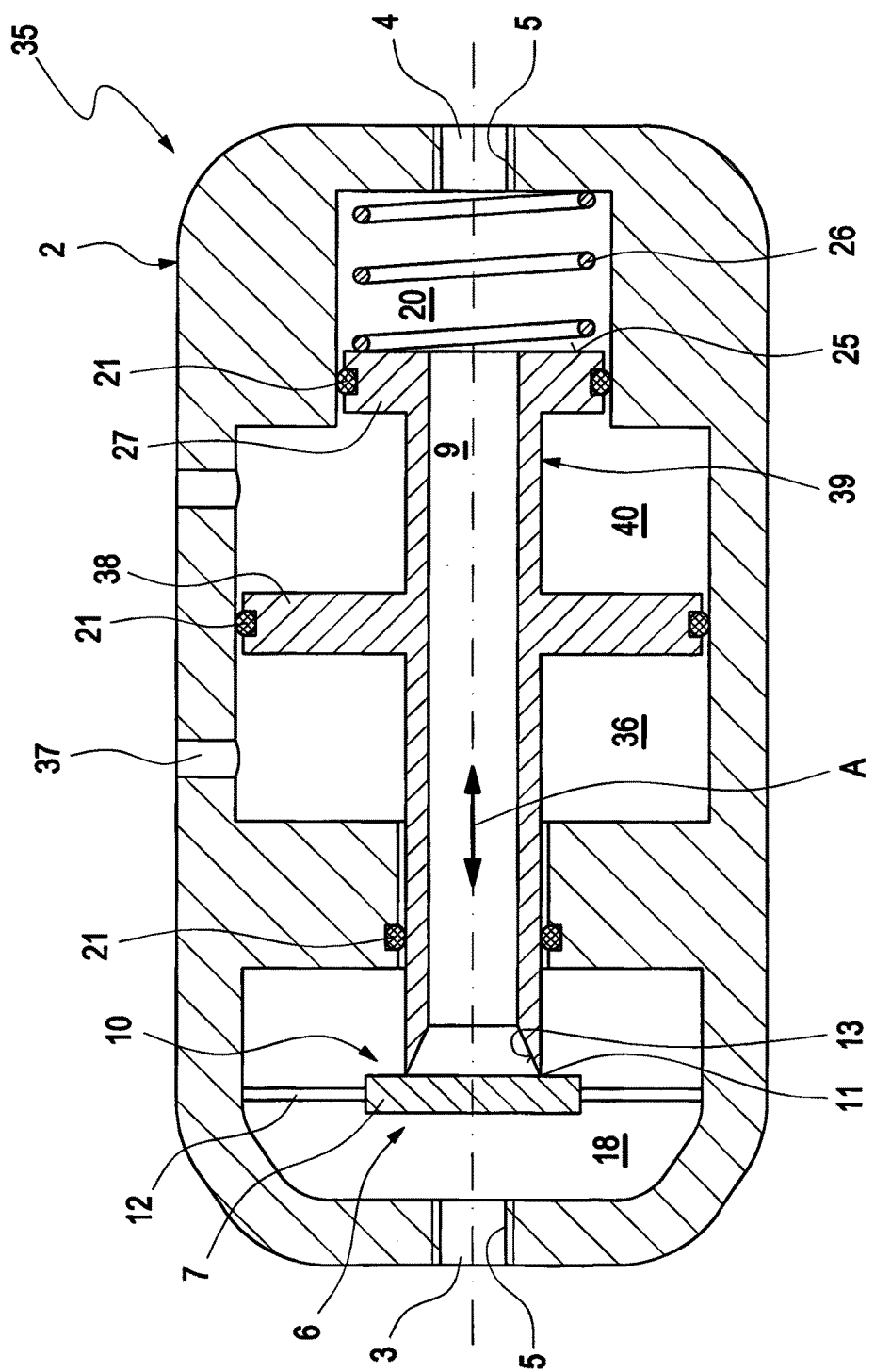
FIG. 3: is a third embodiment of a pressure regulator with an auxiliary spring.

The special design of the tapered surface 13 on the inner side 9 of the valve tube 8 in the vicinity of the valve opening 10 insures that the pressure drop of the fluid, flowing through the pressure regulator 1 will essentially occur in a very small area. Therefore, this construction can be less effected by variations in the pressure within first internal space 18. This is, because the areas, being in contact with the high pressure fluid are extremely small as compared to the areas, being in contact with the low pressure fluid. The auxiliary spring 26 can put the pressure regulator 1 in a shut off state, if there is no load on the main spring 14 (or on the flange part 38 of valve tube 8 in the pressure regulator 35, as shown in FIG. 3). Hence, the fluid regulator 1 described can work as a shut off valve as well.

Of course, it is also possible to design the flange part 27 in a different way, as long as the described functionality of the flange part 27 is provided. For example, the flange part 27 could be designed as a membrane for the like. Of course, such an alternative design could be used in units of a different design as well.

Figure 2:
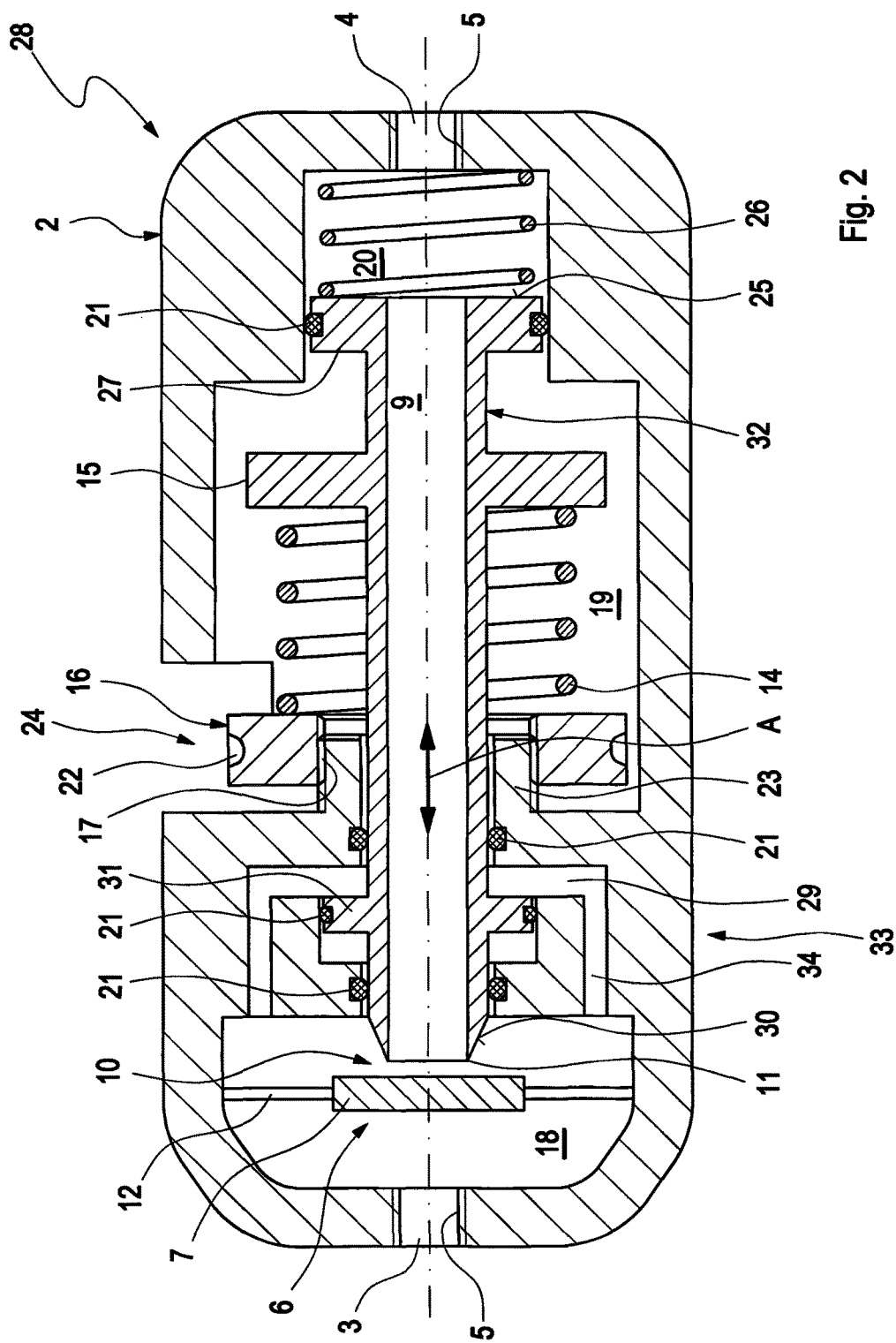
FIG. 2: is a second embodiment of a pressure regulator with an auxiliary spring.

In FIG. 2, a second possible embodiment of a pressure regular 28 is shown. Most parts of the present pressure regulator 28 are similar or the same as those used for pressure regulator 1, as illustrated in FIG. 1.

As described in connection with pressure regulator 1, the presently used valve tube 32 comprises a tapered surface 30 in the vicinity of the valve seat 7. The tapered surface 30, however, is presently arranged on the outside of the valve tube 32, thus facing towards the first internal space 18, being fluidly connected to the fluid inlet port 3 of pressure regulator 28. This, however, introduces a force, urging the valve tube 32 into an opening direction, when high pressure is applied to the first internal space 18. The effective opening force is the vectorial fraction of the pressure force, pointing in the direction of movement of valve tube 32. To balance for this force, the pressure regulator 28 is provided with a balancing section 33. Within the balancing section 33, the fourth internal space 29 is provided, which is fluidly connected to the first internal space 18 by a fluid channel 34. Facing towards the fourth internal space 29, the valve tube 32 is provided with a balancing web 31. The size of the balancing web 31 is chosen in a way that the resulting force, being exerted onto the valve tube 32 when pressure is applied to fluid inlet port 3 (and therefore to first internal space 18 and fourth internal space 29) is of the same magnitude as the force generated by the tapered surface 30. The direction of both forces, however, is opposite to each other. Therefore, both forces cancel each other. Thus, the pressure regulator 28 is balanced towards the high pressure side. In other words, the output pressure characteristics of the pressure regulator 28 is independent of the pressure at fluid inlet port 3.

An advantage of the proposed design with the tapered surface 30 on the outside of the valve tube 32 is that the dimensions of the fluid tube 32 can be chosen from a very wide range. This is, because generally speaking an almost arbitrary size of the surface area on the front side of the valve tube 32 (near valve opening 10) can be compensated by the counteracting force delivered by the ring like web 31 of valve tube 32. Thus, a pressure regulator 28 of the design proposed can be used with very high pressures.

As an example, the thickness of the walls of the valve tube 8, 32 is normally in the order of one millimeter (pressures in the range from 200 to 300 bars). However, with the proposed design, wall thicknesses for the valve tube 8, 32 in the area of several millimeters can be easily realized.

Figure 4:
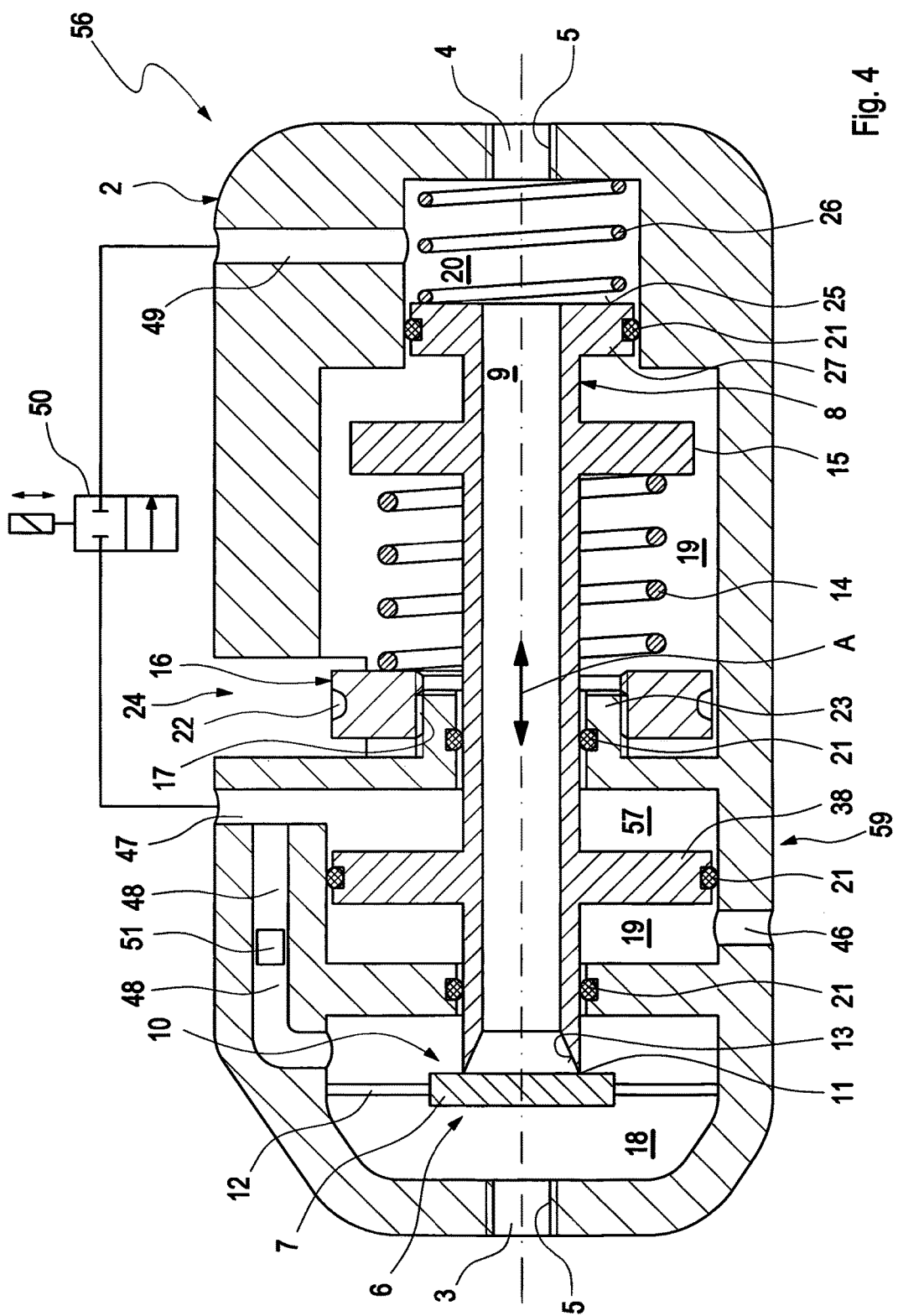
FIG. 4: is a third embodiment of a fluid pressure regulator.
Figure 5:
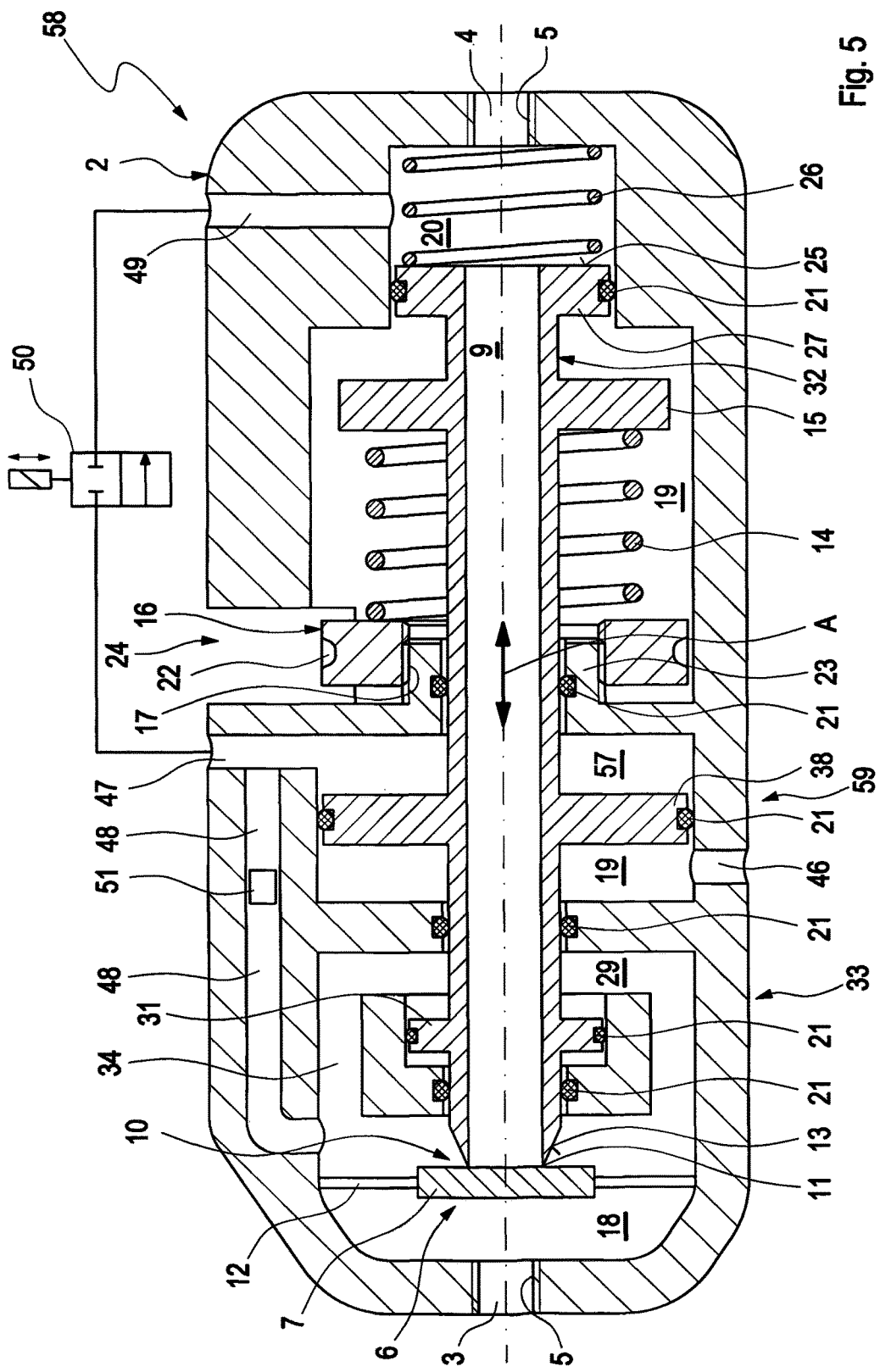
FIG. 5: is a fourth embodiment of a fluid pressure regulator.

Of course, the design of the pressure regulator 28, as shown in FIG. 2, can be used for the design of a pilot driven valve 41, 53 as well (see FIGS. 4, 5). In particular, the arrangement of the tapered surface 30 on the outside of valve tube 32 can be used for pilot driven valves 41, 53. Of course, the tapered surface 30 on the outside of the valve tube 32 can also be used in connection with the pilot driven 37 fluid pressure regulator 35 design, as depicted in FIG. 3.

In FIG. 3 another possible embodiment of a pressure regulator 35 is illustrated. Here, the main spring 14 is omitted. As a replacement for the main spring 14, a pilot pressure chamber 36 is provided. The pilot pressure chamber 36 is fluidly connected to a pilot fluid port 37. On one side of the pilot pressure chamber 36, a flange part 38 of the valve tube 39 is located. Therefore, by applying a pressure to the pilot pressure chamber 36, an appropriate biasing force can be exerted on the valve tube 39. The biasing can be changed by varying the pressure, applied to the pilot pressure chamber 36. It has to be noted that this way an automated change of biasing force can be easily implemented. For optimum performance, the medium in the pressure chamber 36 should be compressible. For example, a gas or a liquid/gas mixture with a certain gas contents could be used. However, even a non-compressible fluid could be used. Particularly in that case, however, some compressible device should be used, like a compressible gas-filled sphere or a kind of spring operated storage, which can be loaded by a pressure pulse in the biasing fluid. The backside volume 40 is of course at ambient pressure.

Apart from this, the pressure regulator 35, as depicted in FIG. 3, resembles the pressure regulator 1, as shown in FIG. 1.

In FIG. 4, a pilot controlled fluid pressure regulator 56 is depicted. The pilot controlled fluid pressure regulator 56 can be considered to be a fluid pressure regulator 1, as shown in FIG. 1, in which a pilot control section 59, comprising an additional closing chamber 57 is provided. The closing chamber 57 is fluidly connected to the first internal space 18 via a feeding line 48 and a connecting line 47. The fluid flux through the feeding line 48 is limited by a throttle 51, which can be formed as a part of the feeding line 48. If the piloting valve 50 is in its closed position (as shown in FIG. 4), the pressure in the closing chamber 57 will eventually be the same as the pressure in the first internal space 18. Therefore, the pressure of the fluid in closing chamber 57 exerts a force on the flange part 38 of valve tube 8. This will cause the valve tube 8 to move to the left side, i.e. pushing the valve tube 8 on the valve seat 7, thus closing the valve unit 6. Therefore, the pilot controlled fluid pressure regulator 56 can be safely closed, irrespective of the fluid pressure in third internal space 20, i.e. irrespective of the fluid pressure at the fluid outlet port 4. Of course, the second internal space 19, lying on the flange part 38 of the valve tube 8, which is opposite to the closing chamber 57, is vented to ambient pressure via channel 46.

If the piloting valve 50 is switched to its open position, however, a fluid connection is established between connecting line 47 and third internal space 20 via piloting valve 50 and discharge line 49. Therefore, the pressure in the closing chamber 57 will drop to the pressure level of third internal space 20. This is, because the influx of fluid is limited by throttle 51. Because of the falling pressure within closing chamber 57, the valve tube 8 is now again free to move to the right side, i.e. into the open position of valve unit 6. Whether this movement will actually take place, or not, depends on the pressure in third internal space 20. Therefore, the pilot controlled fluid pressure regulator 56 now works as a standard fluid pressure regulator.

FIG. 5 is a modification of the pilot controlled fluid pressure regulator 56, shown in FIG. 4. The presently shown pilot controlled fluid pressure regulator 58 shows an additional balancing section 33, which is equivalent to the balancing section 33 of the pressure regulator 28, shown in FIG. 2. In other words, the fluid pressure regulator 28, shown in FIG. 2, can be modified by providing a pilot control section 59. This way, a pilot controlled fluid regulator 58, which is fluid pressure regulated (in particular towards the high pressure side of the pilot controlled fluid pressure regulator), can be realised.

Of course, piloting valve 50 can be designed differently as well. For example, a manual operation of piloting valve 50 is possible. Also, piloting valve 50 can be constructed in a way that intermediary states can be achieved. This can be achieved by providing an intermediary mechanical position of the piloting valve 50. However, a proportional valve is possible as well. This could be achieved by a modulated magnetic valve, for example.

Further information can be drawn from the application, which was filed by the same applicant on the same date under applicant's reference number DAN08005PE. The disclosure of said application is fully integrated into the disclosure of the present application by reference.

While the present invention has been illustrated and described with respect to a particular embodiment thereof, it should be appreciated by those of ordinary skill in the art that various modifications to this invention may be made without departing from the spirit and scope of the present.

What is claimed is:

1. A fluid pressure regulating unit, comprising:
   a fluid inlet port;
   a fluid outlet port;
   a valve comprising a movable valve part comprising a tubular wall defining an inner passage along an axial length of the tubular wall, said movable valve part comprising at least one fluid pressure balancing means, said at least one fluid pressure balancing means comprising a tapered surface disposed on the tubular wall surrounding the inner passage;
   a valve seat;
   a main valve biasing element configured to bias the movable valve part in a direction of a first position; and
   an auxiliary valve biasing element configured to bias the movable valve part in a direction of a second position, being different from said first position;
   wherein the tapered surface is balanced by a balancing surface part;
   wherein at least part of the tapered surface is in contact with the valve seat when the movable valve part is in the second position;
   wherein said tapered surface is closer to said fluid inlet port than said balancing surface part is to said fluid inlet port; and
   wherein the fluid inlet port is fluidly connected with the balancing surface part regardless of the position of the movable valve part.

2. The fluid pressure regulating unit as claimed in claim 1, wherein said first position and said second position are opposing each other, in particular that said first position corresponds to an open position and said second position corresponds to a closed position of said movable valve part.

3. The fluid pressure regulating unit as claimed in claim 1, wherein said main valve biasing element and/or said auxiliary valve biasing element comprises a fluid pressure operated member and/or an elastically deformable member.

4. The fluid pressure regulating unit as claimed in claim 1, wherein the main valve biasing element and/or auxiliary valve biasing element is adjustable.

5. The fluid pressure regulating unit as claimed in claim 1, wherein said valve comprises a variable fluid flow cross section.

6. The fluid pressure regulating unit as claimed in claim 1, wherein said movable valve part comprises an axially movable tubular unit comprising the inner passage.

7. The fluid pressure regulating unit as claimed in claim 1, wherein the valve seat has an even surface.

8. The fluid pressure regulating unit as claimed in claim 1, wherein the position of said movable valve part is independent of the fluid pressure in said fluid inlet port and/or the position of said movable valve part is at least partially dependent on the fluid pressure in said fluid outlet port.

9. The fluid pressure regulating unit as claimed in claim 1, wherein said movable valve part is in said second position if said main valve biasing element is adjusted to an unbiased state.

10. The fluid pressure regulating unit as claimed in claim 1, comprising at least one actuator means.

11. The fluid pressure regulating unit as claimed in claim 10, wherein pilot pressure applying means are provided, which preferably can be selectively connected to said first fluid port and/or said second fluid port.

12. The fluid pressure regulating unit as claimed in claim 11, wherein said pilot pressure applying means can be connected to a respective fluid pressure reservoir via a fluid throughput reducing means.

* * * * *